Patented Sept. 27, 1938

2,131,557

UNITED STATES PATENT OFFICE 2,131,557

LUMINOUS COMPOSITION OF MATTER AND METHOD OF PRODUCING SAME

Jeremiah F. Goggin, Davenport, Iowa

No Drawing. Application March 30, 1936, Serial No. 71,794

1 Claim. (Cl. 134—47)

The present invention pertains to the production of a luminous composition of matter and the product resulting from the practicing of the process herein described. Among the objects of this invention are the production of a highly luminous product; the economical production of a product of the nature indicated; an improved method of producing a luminous composition of matter with the object in view of having a highly luminous product; and such further objects, advantages, and capabilities as will hereafter appear and as are inherent in the process and product herein disclosed.

Phosphorescent products and various methods of producing them are already known but I have, by diligent investigation, discovered a new method of producing such products which results in a more highly luminous substance and one which holds its luminescence for a longer period of time.

Broadly speaking, my invention comprises combining in proper proportions and under proper conditions hydrated lime or alkali earth hydroxide or carbonate; a liquid solution of lithium salts, such as nitrate; a liquid solution of bismuth salts, such as chloride; a liquid solution of chromium, molybdenum, uranium, or tungsten salt and sulphur, or their equivalents. The proportions of these substances may vary considerably and the luminescence will likewise vary. The process of combining these substances is more critical than the amounts thereof. Variations from the substances named above will be stated hereinafter, the present statement being intended merely as illustrative.

The following is given as illustrative of the materials used in producing one form of the substance herein referred to:

Hydrated finishing lime containing about ten per cent (10%) of volatile matter.

Barium hydroxide, $Ba(OH)_2.8H_2O$, generally secured in the form of pure crystals.

Bismuth nitrate, $Bi(NO_3)_3.5H_2O$, the regular crystalline bismuth nitrate obtainable from any chemical supply house.

Ordinary granulated sugar.

Ordinary lithium nitrate as secured from a chemical supply house.

Commercial powdered sulphur, either flowers or roll; however, the flowers of sulphur is preferable because it must be used in powdered form in order to be satisfactory.

The amount of iron content in the above chemicals must be small.

The hydrated lime and barium hydroxide may be and preferably are used in the powdered form, while the bismuth nitrate, sugar, and lithium nitrate are dissolved in water, as set forth hereinafter, and added to the mixture of hydrated lime and barium hydroxide.

The solutions mentioned are best kept in containers provided with means whereby the solutions may be readily drawn from the containers as desired. The bismuth nitrate crystals are dissolved in water to make a solution having a concentration approximately equivalent to twenty-five milligrams (25 mg.) of the nitrate to one cubic centimeter (1 cc.) of solution. Of course, in preparing the solution, one would not want to use these quantities, but they are given merely as illustrative of the proportions used. In preparing the solution, a quantity of the crystals in excess of the amount needed should be powdered and then the requisite amount should be weighted out. Twenty-five grams (25 g.) of the powder is then dissolved in about twenty cubic centimeters (20 cc.) of dilute nitric acid (1:6) and several hundred cubic centimeters of water. If a white precipitate is produced, additional acid must be added to clear up this precipitate, as it is necessary to use sufficient acid to prevent the bismuth nitrate from hydrolyzing and precipitating as the oxynitrate. After complete solution, enough water is added to make one liter, and this solution is then stored in one of the containers.

In making the sugar solution, one kilogram (1 kg.) of sugar is dissolved in about one and five-tenths (1.5) liters of water, the water being warmed if necessary. When the sugar is completely dissolved, water is added to make a total of two (2) liters of solution, and then this is placed in another container for storage until needed.

The lithium nitrate solution is prepared by dissolving two hundred fifty grams (250 g.) of the powdered nitrate in about eight hundred cubic centimeters (800 cc.) of water, and then, when completely dissolved, sufficient water is added to produce a total of one liter. This will give approximately a twenty-five per cent (25%) solution of the lithium nitrate. This is then stored in one of the three containers provided for this purpose.

Since the purity of the sulphur is unimportant, any commercial powdered sulphur may be used.

The proportions of the materials used in preparing six pounds (6 lb.) of this luminous substance are preferably approximately as follows:

| | Grams |
|---|---|
| Calcium oxide (hydrated) | 2,016 |
| Barium hydroxide | 1,088 |
| Bismuth nitrate_____96 cc. of solution__ | 2.4 |
| Sugar_____320 cc. of solution__ | 160 |
| Lithium nitrate_____167 cc. of solution__ | 41.8 |
| Sulphur | 640 |

If these amounts were to be expressed in per cent of the entire weight of materials used, the amounts would be approximately as follows:

| | |
|---|---|
| Calcium oxide | 51.06 |
| Barium hydroxide | 27.60 |
| Bismuth nitrate | 0.06 |
| Sugar | 4.05 |
| Lithium nitrate | 1.08 |
| Sulphur | 16.21 |

This figures up to a little more than one hundred per cent (100%) but the percentages given are only approximate and this slight variation is not enough that it need disturb anyone.

The approximate limits for the typical example given above are about as follows:

| | | |
|---|---|---|
| CaO | 49 | 53 |
| Ba(OH)$_2$.8H$_2$O | 25.6 | 29.6 |
| Bi(NO$_3$)$_3$ | 0.05 | 0.07 |
| Sugar | 3.5 | 4.5 |
| LiNO$_3$ | 1 | 2 |
| S | 14 | 18 |

This produces a blue color.

Method of combining

The predetermined quantities of calcium oxide and barium oxide, in accordance with the proportions given in the above tables, are mixed in a dry state until thoroughly intermingled. Water is then added and the mixture stirred thoroughly to form a thin paste. A better mixture may be produced by bringing the liquid to a boil and stirring for several minutes. This is best done in a container having a glazed surface, such as a graniteware pan. To this paste is added, slowly and with constant stirring, ninety-six cubic centimeters (96 cc.) of the bismuth nitrate solution. It is important that this be added slowly and that it be stirred constantly until a complete and thorough mixing has been accomplished.

It is immaterial whether the sugar or the lithium nitrate is added next but we will assume the addition of the sugar. This requires the addition of three hundred twenty cubic centimeters (320 cc.) of the sugar solution, if the product is being prepared in accordance with the first table given above. This sugar solution should be added slowly and stirred in well in order to produce a uniform mixture. After this, the lithium nitrate solution may be added, slowly and with constant stirring, in order to prevent the formation of the hydroxide which would be precipitated and would prevent the formation of a uniform mixture. The foregoing accounts for everything but the sulphur, and this is to be added at a later stage in the process.

The mixture produced, as above described, is now placed in a suitable container, preferably glazed, such as a granite pan, and evaporated to dryness. In doing this, it is necessary that the mixture be stirred to prevent spattering and to assure homogeneity of the mixture. Since it is very difficult to completely clean a container in which a quantity of the mixture has been dried, it is preferable that the mixing and drying be done in different containers in order to keep one clean for the mixing operation. As the dryness progresses, the paste becomes stiff and lumpy. The lumps should be broken up as much as possible to facilitate the drying.

When the mixture is dry, the required amount of sulphur is added and the mixture is ground to a very fine powder. The finer and more uniform the mixture, the more uniform will be the resulting phosphorescent material. After grinding, the powder is stirred thoroughly in order to assure the sulphur being thoroughly mixed in. Since the mixture is not finely ground to start with and the sulphur is, there is a tendency for the sulphur to leave the grinder first. This makes it necessary that the mixture be thoroughly stirred after the grinding operation is completed. Another procedure is to add the sulphur in small quantities as the grinding proceeds.

The powder, produced as above set forth, is now placed in a suitable container to be heated to a high temperature. This container is preferably a graphite crucible. The No. 8 size will hold a little over two pounds (2 lbs.) of the powder and is probably the most satisfactory as it permits a more uniform heating than would a larger size. The process is more or less critical in the matter of heating as a variation in temperature in excess of twenty degrees (20°) above or below the proper amount is likely to cause partial or complete failure of the process. Also, the period of heating is more or less critical.

This description is given with reference to the pyrometer at Saint Ambrose College, Davenport, Iowa, and any other pyrometer, in order to give accurate results, should be calibrated with this one to determine changes in temperature readings needed to secure the best results. The readings of this pyrometer are correct according to ordinary methods of calibration, and it possesses the usual accuracy.

Before the mixture is placed in the furnace, the temperature of the furnace should be brought to nine hundred degrees (900°), and it should be maintained within not to exceed twenty degrees (20°) of this point during the time of heating. Any suitable heating means may be used, provided a reducing atmosphere is maintained in the heating chamber. For two pounds (2 lbs.) of mixture in a No. 8 crucible, the heating period is from two and one-fourth (2¼) to two and one-half (2½) hours. Larger crucibles will require experimentation to determine the exact period of heating required to produce the best results. If a No. 5 crucible, containing a smaller amount of the mixture, is used, the time may be reduced to from forty-five (45) to sixty (60) minutes. The degree of fineness of the material is also a determining factor in the length of time required.

Since graphite crucibles are fragile, it is necessary that they be handled carefully. If properly handled, they will withstand a great number of heats but the graphite is gradually oxidized and only the fireclay base remains. For this reason, the crucibles become brown after one or two heats.

After the heating has been completed, the crucibles should be removed from the furnace and covered with a piece of asbestos to prevent oxidation of the material. They should then be set in as cool a place as possible and allowed to remain undisturbed until cool. This may require one or two hours, depending upon the method of cooling. When the cooling has been completed, the top layer of oxidized matter is to be scraped away until the surface exposed is a uniform yellow color. The phosphorescence of the exposed surface is then to be tested. If it shows a uniform bright blue color, the heating temperature and time have probably been correct. However, before turning out the sulphides, the upper three-fourths inch (¾ in.) should be removed and the new surface again tested. If it appears to consist of two layers with the inner core luminescing only poorly, the heating time has been too short. The outer layer may be recovered by cautiously separating it from the inner layer. This is not difficult as the two layers tend to cohere quite well. Re-heating of the center portion is of no value, and this must be regarded as waste material. If it is the outer layer which is poor in luminescence, it is an indication of too high a temperature or too long a period of heating. It is for this reason that the temperature and time of heating must be so closely watched throughout this entire period of heating.

While still hot, the sulphides will luminesce with a green color which becomes blue as they cool. Various procedures have been followed in an effort to determine what is the most desirable practice for the production of the best results. Several of these have had to be discarded as worthless or even harmful. As an illustration, the barium and calcium hydroxides were preheated at a temperature varying from six hundred to eight hundred degrees (600°–800°) but this yielded a less satisfactory result. Also, covering the crucible with a tight fitting fireclay plug prevents the escape of the excess sulphur and the result is not so good. If the sulphur is mixed with the wet paste, before drying, it is readily taken up to form polysulphides which are decomposed when heated to the temperature required by this method. This gives a perfectly uniform distribution of the sulphur but for some reason the same results are not attained as by following the method described above. There is no advantage in using this procedure and it, in fact, yielded a poorer product.

It has been indicated above that the materials used may be varied. When the materials are varied, it necessitates corresponding changes in the temperature. It is believed, however, that for a satisfactory product, the maximum temperature is approximately one thousand degrees centigrade (1,000° C.). Similarly, the lower limit for satisfactory results appears to be approximately seven hundred degrees centigrade (700° C.). However, it is possible that mixtures not yet tried might prove that these limits should be altered. The degree of fineness of the mixture to be heated will alter both the time and the temperature of heating.

In the variation of materials referred to above, the calcium and barium compounds may be replaced in whole or in part by equivalent amounts of such materials as the basic oxides, hydroxides, and carbonates of strontium, zinc, and cadmium. As there would be variations in the quantities of the materials given in the typical example, so also, there would be corresponding variations in these materials.

In the typical example given above, bismuth nitrate is used as an activator. As substitutes for this, in whole or in part, equivalent quantities of basic substances such as copper nitrate ($Cu(NO_3)_2$), manganese chloride ($MnCl_2$), rubidium nitrate ($RbNO_3$), caesium sulphate ($Cs_2SO_4$), and chromium chloride ($CrCl_3$) may be used. Also, acidic substances may be used, such as sodium chromate ($Na_2CrO_4$), potassium molybdate ($K_2MoO_4$), and sodium tungstate ($Na_2WO_4$).

The lithium nitrate, in the typical example given above, was used as a flux. Other fluxes, such as molybdates, carbonates, nitrates, borates, phosphates, chromates, tungstates, chlorides, and sulphates of alkali metals and alkali earth metals may be substituted in equivalent amounts for the lithium nitrate.

In the typical example, the sugar serves as a binder and as a reducing agent. Equivalent quantities of such carbohydrates as cellulose and glucose may be used, as may also an equivalent quantity of ground carbon.

The sulphur may be replaced, in whole or in part, by equivalent quantities of selenium (Se) and tellurium (Te). The resulting product will be a luminous selenide or telluride instead of a sulphide.

By a proper choice of materials and operating conditions, blue, red, and colors intermediate between blue and red have been produced. For example, the color green has been produced by the use of the following mixture and proceeding as for blue: Strontium hydrate, bismuth nitrate, sodium tungstate, lithium nitrate, and sulphur. The percentage limits of these substances and for anything like satisfactory results appear to be about as follows:

| | | |
|---|---|---|
| $Sr(OH)_2.8H_2O$ | 91 | 94 |
| $Bi(NO_3)_3$ | 0.25 | 0.29 |
| $Na_2WO_4.2H_2O$ | 0.341 | 0.381 |
| $LiNO_3$ | 0.341 | 0.381 |
| S | 5 | 8 |

The following table repeats the two typical examples given and indicates the substitutions which may be made for the substances given in the typical examples.

| | Basic luminescent formers | Activators | Reducers | Fluxes | Acid luminescent formers |
|---|---|---|---|---|---|
| Blue | CaO. $Ba(OH)_2.8H_2O$. | $Bi(NO_3)_3.5H_2O$. | Carbohydrate. | $LiNO_3$. | S. |
| Green | $Sr(OH)_2.8H_2O$. | $Bi(NO_3)_3.5H_2O$. | Carbohydrate. | $LiNO_3$. | S. |

*Substitutes*

| | Basic luminescent formers | Activators | Reducers | Fluxes | Acid luminescent formers |
|---|---|---|---|---|---|
| | Oxides, hydroxides, carbonates of— Sr. Zn. Cd. Ra. | $Cu(NO_3)_2$. $MnCl_2$. $RbNO_3$. $Cs_2SO_4$. $CrCl_3$. $Na_2CrO_4$. $K_2MoO_4$. $Na_2WO_4$. | Carbohydrates such as sugars and celluloses. | Molybdates, carbonates, nitrates, borates, phosphates, chromates, tungstates, chlorides, sulphates of alkali metals and alkali earth metals. | Se. Te. |

In this specification and the appended claim, the expression "Luminescent formers" is used as the equivalent of "Luminaphores" and the word "Reducers" is used as the equivalent of "Reducing agents."

I have by no means named all of the substances which have been tried and found to work, nor is it possible to give, within reasonable limits, all of the operating conditions for all of the combinations of substances which may be combined to produce a satisfactory product. I have, however, indicated a typical example and indicated how variations of substances, temperatures, fineness of powder, and time of heating may modify the results which are evidenced by a product having a greater or less phosphorescence. In view of the number of variables and the amount of variation which may occur, I do not wish to be limited to any particular proportions of the substances used, since these may vary with the substances chosen. Also, as indicated above, the temperature and time of heating must vary with the substances used and the proportions thereof.

It is of course understood that the specific disclosure given above may be departed from without departing from the spirit of this invention as set forth in this specification and in the appended claim.

Having now disclosed by invention, I claim:

The method of producing phosphorescent material which comprises mixing dry hydrated calcium oxide and dry barium hydroxide, both in powdered form, in the proportion of forty-nine to fifty-three (49 to 53) parts of the former to twenty-five and six-tenths to twenty-nine and six-tenths (25.6 to 29.6) parts of the latter, adding water and stirring to form a thin paste; adding to the paste, slowly and with constant stirring, a solution of five-hundredths to seven-hundredths (.05 to .07) parts of bismuth nitrate; adding to the mixture, while stirring, three and five-tenths to four and five-tenths (3.5 to 4.5) parts of sugar in solution; adding to the mixture, slowly and with constant stirring, a solution of one to two (1 to 2) parts of lithium nitrate; evaporating the mixture to approximate dryness, the mixture being stirred while drying; reducing the dry mixture to a powder; adding to the dry mixture fourteen to eighteen (14 to 18) parts of sulphur in powdered form; grinding and mixing the mixture; and heating the mixture in a reducing atmosphere at a temperature of approximately nine hundred degrees centigrade (900° C.) for approximately three (3) hours.

JEREMIAH F. GOGGIN.